Jan. 10, 1967     G. H. ELDER, JR     3,296,669
LACE OR LINE LOCKING DEVICE
Filed April 13, 1965     2 Sheets-Sheet 1
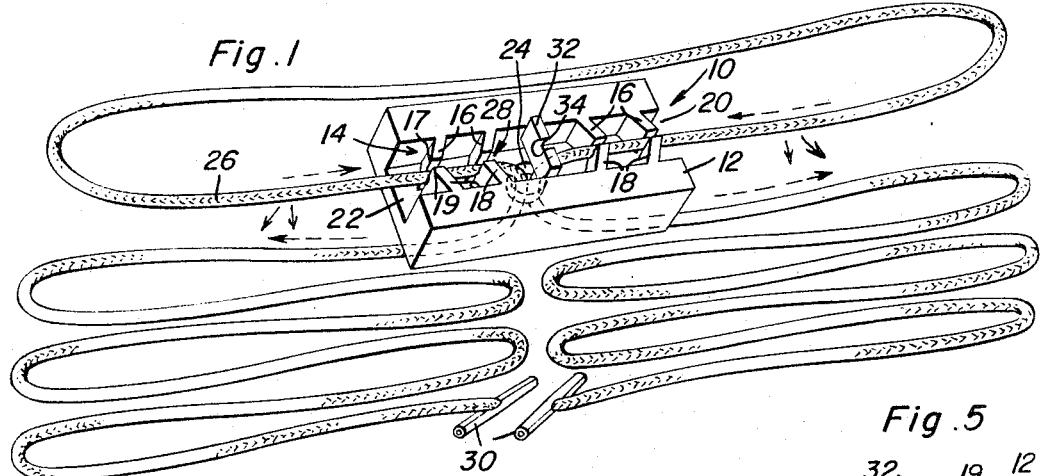
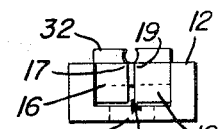
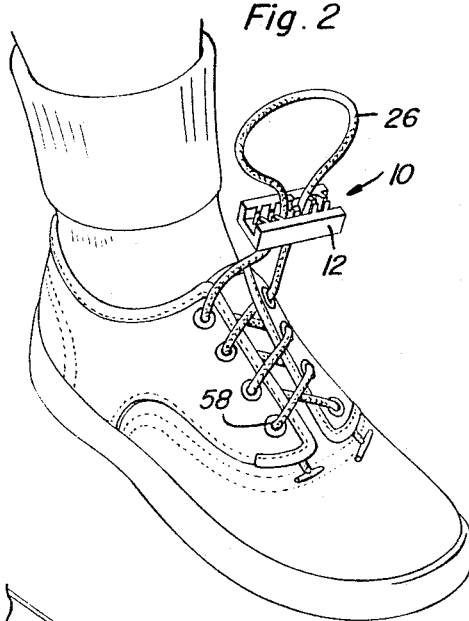
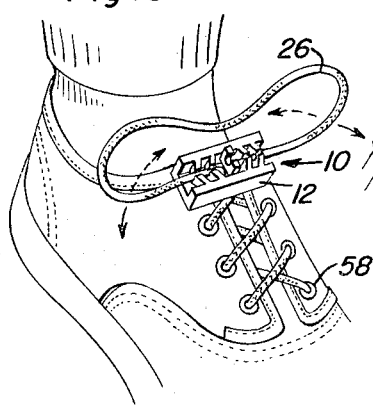
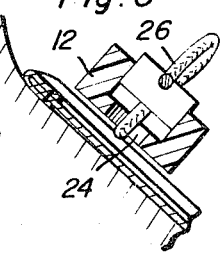
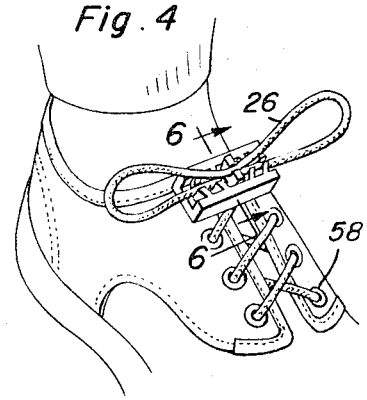
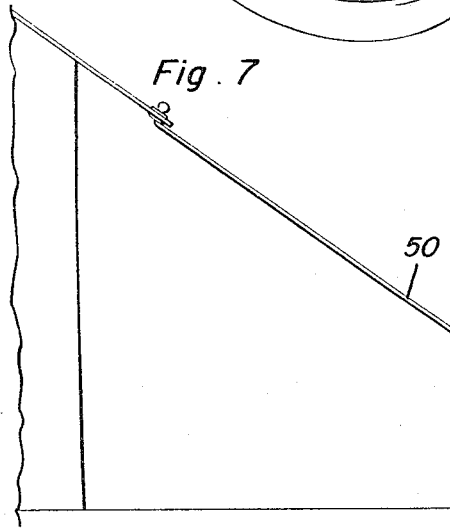
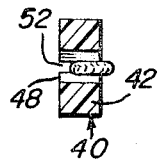
George H. Elder, Jr.
INVENTOR.

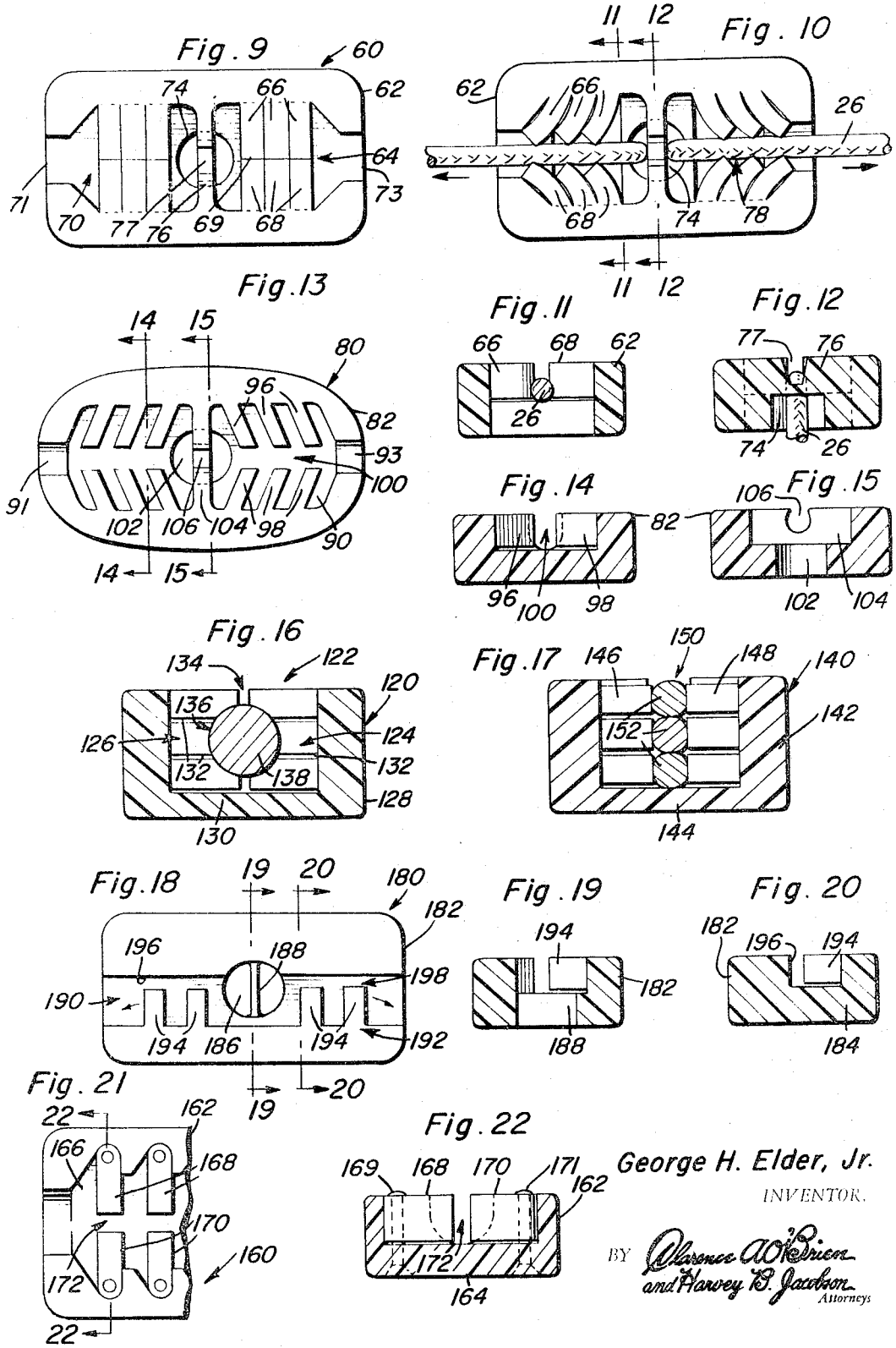

United States Patent Office 3,296,669
Patented Jan. 10, 1967

1

3,296,669
LACE OR LINE LOCKING DEVICE
George H. Elder, Jr., Hydes, Md., assignor to The Plykon Corporation, a corporation of Maryland
Filed Apr. 13, 1965, Ser. No. 447,837
5 Claims. (Cl. 24—121)

This invention relates to a lace or line locking device, and more particularly to an improved locking device for holding shoelaces and other lines in a generally taut condition, thereby precluding the necessity of tying a knot to secure the shoelace, or line.

An object of this invention is to provide an improved shoelace or line locking device which eliminates the necessity of tying a knot in the shoelace or line to secure the shoelace, or line.

Another object of this invention is to provide an improved shoelace or line locking device which is provided with a means of frictionally engaging the shoelace, or line to be secured.

Still another object of this invention is to provide an improved shoelace or line locking device which is simple in design, inexpensive to manufacture, and which enables the shoelaces, or lines to be tightened more rapidly and with equal effectiveness as by the use of ordinary knots.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top perspective view of the shoelace, or line locking device embodiment of the present invention, further showing a shoelace frictionally secured within the device;

FIGURE 2 is a perspective view of the shoelace locking device of FIGURE 1 and its associated shoelace shown positioned in the eyelets of a shoe, further showing the relationship of the locking device and the shoelace prior to securing the shoelace in the frictional gripping means of the shoelace locking device;

FIGURE 3 is a top perspective view of the device of FIGURES 1 and 2 further showing the shoelace drawn taut and frictionally secured by the present device;

FIGURE 4 is a top perspective view of the device of FIGURE 1, further showing the loop of the shoelace frictionally secured by a portion of the present device to simulate a conventional bow;

FIGURE 5 is a side elevational view of the shoelace locking embodiment of the present device;

FIGURE 6 is a slightly enlarged vertical cross-sectional view of the shoelace locking embodiment taken substantially along the plane of the line 6—6 of FIGURE 4;

FIGURE 7 is a side elevational view of the line locking embodiment of the present invention shown secured to a tent peg, and further showing a tent rope frictionally secured by the present device;

FIGURE 8 is a vertical cross-sectional view of the line locking device of FIGURE 7 taken substantially along the plane of the line 8—8 of FIGURE 7;

FIGURE 9 is a top plan view of a further embodiment of the present invention;

FIGURE 10 is a top plan view of the device of FIGURE 9, further showing a lace or line frictionally secured by the present device;

FIGURE 11 is a transverse sectional view taken substantially along the plane of the line 11—11 of FIGURE 10;

FIGURE 12 is a transverse sectional view taken sub-

2 stantially along the plane of the line 12—12 of FIGURE 10;

FIGURE 12 is a transverse sectional view taken substantially along the plane of the line 12—12 of FIGURE 10;

FIGURE 13 is a top plan view of a further modification of a lace or line locking device embodying the present invention;

FIGURE 14 is a transverse sectional view taken substantially along the plane of the line 14—14 of FIGURE 13;

FIGURE 15 is a transverse sectional view taken substantially along the plane of the line 15—15 of FIGURE 13;

FIGURE 16 is a transverse sectional view taken through a still further embodiment of the present device, further illustrating a modification of the resilient frictional engaging fingers wherein the fingers are horizontally segmented and are further provided with concave portions which cooperate to define an annular surface which is particularly suitable for the retention of ropes, or the like with a relatively large diameter;

FIGURE 17 is a transverse sectional view through still a further embodiment of the present invention similar to the embodiment 16 in that the frictional engaging members are horizontally segmented but are not provided with concave regions;

FIGURE 18 is a top plan view of another embodiment of the present invention;

FIGURE 19 is a transverse sectional view taken substantially along the plane of the line 19—19 of FIGURE 18;

FIGURE 20 is a transverse sectional view taken substantially along the plane of the line 20—20 of FIGURE 18;

FIGURE 21 is a fragmentary top plan view of a portion of a further embodiment of the present invention wherein the frictional engaging members are pivotally secured to the body of the device; and FIGURE 22 is a transverse sectional view taken substantially along the plane of the line 22—22 of FIGURE 21.

Briefly, the present invention provides a shoelace, or line locking device which is fabricated of a relatively rigid yet somewhat resilient material such as rubber, plastic, or the like, which is provided with at least a pair of opposed resilient or pivotally secured elements which are in spaced apart relationship in a generally directly opposed or shallow V-shaped configuration. This configuration provides a frictional engaging slot between the opposed resilient or pivotally secured elements. The generally V-shaped configuration of the resilient gripping elements is pointed away from the direction of the forces tending to pull on the shoelace, or line retained therein so that the normal stress on the line being retained tends to pull the opposed resilient gripping elements into a straight line relationship thereby increasing the frictional grip on the shoelace, or line retained therein.

Referring now to the drawings and FIGURE 1 in particular, there is indicated one embodiment of the present invention. A shoelace locking device 10 is provided with means for frictionally engaging the central portion of a shoelace to maintain the shoelaces in a taut condition. The shoelace locking device 10, which is formed of a relatively firm yet somewhat resilient rubber, plastic or the like includes a generally rectangular elongated body portion 12. The body portion 12 is of sufficient width and height to permit integral placement of a frictional shoelace retaining means therein. The frictional retaining means is indicated generally at 14. The frictional retaining means 14 includes a plurality of opposed resilient elements 16 and 18. The opposed resilient members 16 and 18 are secured to or integrally cast or molded with the body portion 12 of the shoelace locking device 10 within a generally rectangular longitudinally disposed groove 20. The resilient elements 16 and 18 are integral with the upstanding walls formed by the groove 20, but may be spaced apart from the bottom 22. The bottom 22 of the groove 20 is provided with a centrally disposed aperture 24 as seen best in FIGURES 1 and 6. The centrally disposed aperture 24 is substantially larger than the shoelaces 26 extending therethrough and it will also be noted that the aperture 24 is larger than the distance between the opposed resilient elements. The aperture 24 does not function to frictionally engage the shoelace 26 but merely provides a means of drawing the shoelace 26 up into the frictional retaining means 14.

The opposed resilient members 16 and 18 which comprise the frictional retaining means 14 are disposed in shallow V-shaped configuration in the generally rectangular longitudinally disposed groove 20 intermediate the centrally disposed aperture 24 and the ends of the body portion 12 of the shoelace locking device 10. The opposed resilient members 16 and 18 normally assume a V-shaped configuration with their adjacent opposed respective ends 17 and 19 normally in a slightly spaced apart relationship, thereby providing a plurality of frictional shoelace retaining slots indicated generally at 28. The frictional shoelace retaining slots 28 are normally of slightly less width than the shoelace to be retained. Due to their resilient nature and the fact that they are preferably not secured to the upper surface of the bottom 22 of the body 12, the opposed resilient members 16 and 18 are free to flex sufficiently to receive the shoelace 26 as it is urged downwardly into the frictional retaining slots 28 by pulling the shoelace 26 outwardly and downwardly into the slots 28 as shown by the arrows in FIGURE 3.

In FIGURE 1 the shoelace 26 is shown frictionally retained by the frictional retaining means 14 by virtue of the fact that as the shoelace 26 attempts to move in the direction shown by the broken line arrows in FIGURE 1, as would be the normal condition with the shoelaces operatively positioned in the eyelets 58 of a shoe, the opposed resilient members 16 and 18 would be urged toward a generally straight line position thereby partially closing the frictional shoelace retaining slots 28 and consequently increasing the friction on the shoelace 26. In order to function properly, the opposed pairs of resilient members 16 and 18 must have their generally V-shaped configuration pointed away from the direction of the forces tending to pull on the shoelace retained therein.

As seen best in FIGURES 1, 5 and 6, the shoelace locking device 10 includes a frictional clamping means 32 which is provided to frictionally retain the loop forming a central portion of the shoelace in a channel-shaped groove 24.

Referring now to FIGURES 7 and 8, another embodiment of the present invention is indicated generally at 40. The embodiment indicated generally at 40 may be utilized to tighten, or secure a cord, rope or the like such as may be utilized in erecting a tent, for example. Although the embodiment 40 is illustrated as being operatively associated with a tent, it will be understood that the embodiment 40 of the present line locking device could be used to secure garment closures, packages, sail lanyards, or the like. The line locking device 40 includes a generally rectangular body portion 42 which is provided with an integral projecting tab portion 44. The integral tab portion 44 is further provided with an aperture 46 therethrough to facilitate securing the line locking device 40 to a relatively stationary member such as a tent peg, sailboat deck cleat, or the like. The body portion 42 of the line locking device 40 is provided with an aperture therethrough adjacent the end of the body 42 with the integral tab portion 44. The aperture 48 in the body 42 of the line locking device 40 is of substantially greater cross-sectional area than the line 50 which is to be secured by the line locking device 40. As seen best in FIGURE 7, the body 42 is provided with a longitudinally disposed slot 52 which extends down through a portion of the body 42 and also extends longitudinally from the aperture 48 to the end 54 of the body 42. A plurality of integral generally V-shaped opposed resilient members 56 and 58 are provided. The resilient members 56 and 58 function in a manner identical to that of the opposed resilient members 16 and 18 of the shoelace locking embodiment 10.

In use, the shoelace and line locking embodiments 10 and 40 of the present invention would be utilized in the following manner.

The shoelace locking embodiment 10 with the shoelace 26 inserted as a loop strand as shown in FIGURE 2 would be inserted down through the eyelets in the shoe by pivoting the shoelace portions 26 and criss-crossing the shoe lace down through the eyelets 58 from top to bottom as shown in FIGURE 2 and then releasing the shoelace tips 30 to permit them to prevent the ends of the shoelace 26 from pulling up through the lowermost eyelets. With one hand grasping the upper loop 26 as shown in FIGURE 2, it is merely necessary to move the shoelace locking device 10 downwardly against the body of the shoe while simultaneously pulling the shoelace 26 taut by virtue of the fact that the shoelace tips 30 are drawn tight against the underside of the lowermost eyelets 58. With the shoelace locking device 10 in the position described, it is merely necessary to urge the laterally opposed ends of the loop of the shoelace 26 downwardly and outwardly in the direction indicated by the arrows in FIGURE 3 to urge the opposed ends of the shoelace 26 into the frictional shoelace retaining slots 28 thereby securely locking the ends of the shoelace 26 in the shoelace locking device 10. The shoelace 26 is then substantially secured by the shoelace locking device 10. To simulate a bow and secure the loop in the shoelace 26 it is merely necessary to urge the central portion of the loop of the shoelace 26 above the shoelace locking device 10 into the channel-shaped groove 34 and the clamping means 32 as best seen in FIGURES 4 and 6.

From the foregoing it will be apparent that during walking etc., the shoelace 26 which passes upwardly and outwardly through the aperture 24 in the body 12 of the shoelace locking device 10 will attempt to move downwardly. This attempt of the lace 26 to move downwardly through the aperture 24 will be resisted by virtue of the fact that the opposed resilient members 16 and 18 will be brought into increasingly greater frictional engagement with their respective portions of the shoelace 26 thereby substantially precluding any movement of the shoelace 26 until such time as the respective portions of the shoelace 26 are manually withdrawn from the frictional shoelace retaining slots 28 with an upward inward motion as indicated by the broken line arrows in FIGURE 3.

The embodiment 40 of the present invention which is illustrated in FIGURES 7 and 8 functions in a manner quite similar to that of the shoelace locking embodiment 10. The line locking embodiment 40 would be secured to a stationary member, such as a tent peg 60, for example, by means of the aperture 46 in the projecting tab 44. The tent rope 50 is then secured by some suitable means to the eyelet, or the like, in the tent and the free end of the rope 50 is then passed through the aperture 48 in the body 42 on the line locking device 40 and the line drawn taut as shown by the arrow in FIGURE 7. Simultaneously, the line 50 is urged downwardly into the longitudinally disposed slot 52 and thereby comes into frictional engagement with the generally V-shaped opposed resilient members 56 and 58, thereby effectively locking the line 50 in the line locking device 40.

Referring now to FIGURES 9, 10, 11 and 12, another embodiment of the present invention is indicated generally at 60, and includes a body portion 62. A frictional retaining means indicated generally at 64 includes a plurality of opposed resilient elements 66 and 68 which are integral with the body portion 62. The opposed resilient elements 66 and 68 abut but are not connected at 69. The elements 66 and 68 are resiliently secured within a recessed area 70 which has a configuration of a generally elongated octagonal recess, the opposed ends of which are open as at 71 and 73. The body portion 62 is further provided with a central aperture 74. An integral member 76 is provided with a line retaining notch 77 which is analogous to the notch 34 of member 32.

Referring now to FIGURE 10 it will be seen that when the embodiment 60 is utilized in a manner analogous to the utilization of the embodiment 10 as shown in FIGURES 2, 3, and 4, the line, or lace 26 may be secured by urging it outwardly and downwardly in the direction of the arrows to urge the resiliently secured elements 66 and 68 into a spaced apart shallow V-shaped configuration thereby defining a frictional line retaining slot indicated generally at 78.

In operation the embodiment 60 is therefore substantially identical to the operation of the embodiment 10.

Referring now to FIGURES 13, 14 and 15 there is illustrated a further embodiment of the present invention indicated generally at 80, which includes a body portion 82 characterized by a recessed area with the configuration of a generally elongated octagonal recess 90, the opposed ends 91 and 93, which are open. A plurality of opposed resilient elements 96 and 98 are integral with the body 82 and project inwardly of the recess 90 to define a frictional line retaining slot indicated generally at 100. It will be noted that the opposed spaced apart elements 96 and 98 are normally in a shallow V-shaped configuration. The embodiment 80 is also provided with a centrally disposed aperture 102 and a transverse member 104 which is provided with a line retaining slot 106 the utility of which is identical to their analogous counterparts in the embodiments 10 and 60.

It will be noted that the primary difference between the embodiments 10, 60 and 80 is the fact that by placing the member 104 flush with the upper surface of the body 82, the molding of the device may be greatly facilitated by eliminating undercuts in the forming mold. The operation of the embodiments 60 and 80 will be understood to be substantially identical to the operation of the embodiment 10.

Referring now to FIGURES 16 and 17, further modifications constructed in accordance with this invention include embodiments indicated generally at 120 and 140. As seen in FIGURE 16, the embodiment 120 is characterized by a frictional retaining means indicated generally at 122 which includes a plurality of opposed resilient elements indicated generally at 124 and 126. The opposed resilient elements 124 and 126 are secured to or integral with the body portion 128 of the embodiment 120 and in addition to being in spaced apart relationship from the bottom wall 130 of the body 128 are also horizontally segmented such as at 132. The opposed free ends of the resilient members 124 and 126 cooperate to define a frictional line retaining slot indicated generally at 134. In addition, the opposed free ends of the resilient elements 124 and 126 are provided with concave portions adjacent their free ends which cooperate to form a generally circular aperture indicated generally at 136 within which a relatively heavy line 138 may be frictionally retained by virtue of the fact that the opposed elements 124 and 126 asume a generally shallow V-shaped frictional engaging configuration, not shown, such as resilient elements 16 and 18 of the embodiment 10.

Referring now specifically to FIGURE 17, the embodiment indicated generally at 140 includes a body portion 142 having a bottom wall 144. The embodiment 140 is similar to the embodiment 120 in that it is provided with horizontally segmented opposed resilient members indicated generally at 146 and 148 which cooperate to define a frictional engaging slot indicated generally at 150. The opposed resilient members 146 and 148 are secured to or integral with the body portion 142 of the embodiment 140 and are normally in a generally V-shaped configuration, not shown, such as the configuration of the opposed elements 16 and 18 of the embodiment 10. The embodiment 140 is primarily intended for the frictional retention of a plurality of lines 152 which may accordingly be retained in a vertically stacked arrangement. The operation of the embodiment 140 is substantially identical to the operation of the embodiment 10.

Referring now to FIGURES 21 and 22, a further embodiment is indicated generally at 160 and includes a body portion 162 and a bottom wall portion 164 which is characterized by a recessed region 166 within which a plurality of opposed elements 168 and 170 are pivotally secured by suitable pivot pins such as at 169 and 171, thereby defining a frictional line retaining slot indicated generally at 172. In operation, the embodiment 160 provided with the pivotally secured opposed elements 168 and 170 functions in a manner substantially identical to the operation of the embodiment 10.

Referring now to FIGURES 18, 19 and 20, there is illustrated a further embodiment indicated generally at 180 which includes a body portion 182 having a bottom wall portion 184 and a centrally disposed aperture 186 provided with a transverse web 188 to maintain the individual strands of a lace or line in spaced apart relation. The body portion 182 of the embodiment 180 is further provided with an elongated slot indicated generally at 190. In the embodiment 180 the frictional retaining means indicated generally at 192 includes a plurality of integral resilient members 194 which cooperate with the opposed somewhat resilient vertical surface 196 of the body portion 182 to define a frictional line retaining slot indicated generally at 198. In operation, the device 180 would be analogous to the embodiment 10 in a manner as follows: The line to be secured would be passed upwardly through apertures 186 with one portion of the line on one side of the web member 188 and the other portion of the line on the opposite side of the member 188. The ends of the lines would then be grasped and pulled outwardly and downwardly such as shown by the arcuate full line arrows of FIGURE 3 to frictionally retain the line within the frictional retaining slot 198 of the embodiment 180. It will be understood that the width of the frictional retaining slot 198 of the embodiment 180 is such that the line being retained within the slot 198 deflects the resiliently secured members 194 in the direction of the arrows of FIGURE 18 thereby frictionally retaining the line placed therein in a manner analogous to the operation of the embodiment 10.

It will therefore be seen that there is provided a line locking device suitable for a multitude of applications which is of relatively simple design and is highly effective for the purposes intended. Although the various embodiments with the exception of embodiment 160 have been illustrated as being integrally molded, for example, it will be understood that the devices of the present invention may be fabricated from other suitable relatively firm resilient material such as bar, or sheet stock, the several portions of which are then integrally or pivotally secured.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A line locking device including a body member, said body member being substantially thicker and wider than the line being retained, said body being provided with a single aperture substantially larger than the line being retained, a resilient line retaining means integral with said body member, said resilient means including at least two pairs of opposing resilient elements having opposed gripping surfaces, each of said pairs of resilient elements being disposed in a generally V-shaped configuration in spaced apart relation, said spaced apart relation of said members defining a frictional line engaging slot, said two pairs being equidistantly spaced from said single aperture, said frictional line engaging slot being adapted to frictionally engage a line inserted therein, said single aperture being larger than the distance between the opposed gripping surfaces of the opposed resilient elements, said generally V-shaped resilient retaining means being pointed away from the direction of the forces tending to pull on the line while frictionally gripping the line retained therein.

2. A line retaining device comprising a generally rectangular elongated body member, a longitudinally disposed recess in said body, said recess having a cross-sectional area greater than the line being retained, said body portion provided with an aperture through the body and in communication with said longitudinally disposed recess intermediate of its ends, said aperture being of greater cross-sectional area than the line being retained, at least two pair of opposed resilient elements having opposed gripping surfaces, each pair of said resilient elements being secured in a generally V-shaped configuration in spaced apart relation, one of said pairs of said resilient elements being positioned on one side of said aperture, the other pair of said resilient elements being positioned on the other side of said aperture, said opposed spaced apart relation of each pair of said members defining a frictional engaging slot, said frictional engaging slot being adapted to frictionally engage a line inserted therein, each of said generally V-shaped resilient retaining means being pointed away from the direction of the forces tending to pull on the line while frictionally gripping the line retained therein, and a channel-shaped clip secured to said body to receive the free ends of the frictionally secured line.

3. A shoelace retaining device comprising a generally rectangular elongated body member, a longitudinally disposed groove in said body, said groove having a cross-sectional area greater than the shoelace being retained, said body portion being formed with an aperture through the body and in communication with said longitudinally disposed groove intermediate of its ends, said aperture being of greater cross-sectional area than the shoelace being retained, at least two pair of opposed resilient elements having opposed gripping surfaces, each pair of said resilient elements being secured in a generally V-shaped configuration and spaced apart relation on either side of said aperture, said spaced apart relation of the opposed members defining a frictional engaging slot, said frictional engaging slot being adapted to frictionally engage a shoelace inserted therein, each of said generally V-shaped resilient retaining means being pointed away from the direction of the forces tending to pull on the shoelace while frictionally gripping the line retained therein.

4. The structure of claim 1 wherein said resilient elements are horizontally segmented to define an element having a plurality of fingers.

5. A line locking device including a body member, said body member including a base portion, said base portion being provided with opposed spaced apart upstanding walls, said base member also being provided with an aperture adapted to receive a line to be locked by said device, at least two pairs of opposed resilient elements integral with said walls and having opposed gripping surfaces, said resilient elements being positioned between said aperture and one end of said body member, said pairs of resilient elements being disposed in a generally V-shaped configuration in spaced apart relation, whereby said members define a frictional line engaging slot, said aperture being larger than the distance between the opposed gripping surfaces of the opposed resilient elements, said V-shaped opposed resilient elements diverging toward said aperture in said base member, and said body member being provided with means to secure the line locking device to an art device in conjunction with which it is utilized.

References Cited by the Examiner

UNITED STATES PATENTS

| 553,832 | 2/1896 | Bourne | 24—121 |
| 2,813,323 | 11/1957 | Civitelli | 24—121 X |
| 2,845,673 | 8/1958 | Weis | 24—121 |

FOREIGN PATENTS

| 497,455 | 5/1930 | Germany. |
| 39,761 | 12/1915 | Sweden. |

BERNARD A. GELAK, *Primary Examiner.*